US012710295B2

(12) United States Patent
Tomizawa et al.

(10) Patent No.: US 12,710,295 B2
(45) Date of Patent: Aug. 18, 2026

(54) SENSOR, SENSOR SYSTEM, AND ELECTRONIC DEVICE

(71) Applicant: KABUSHIKI KAISHA TOSHIBA, Tokyo (JP)

(72) Inventors: Yasushi Tomizawa, Fuchu Tokyo (JP); Hideaki Murase, Yokohama Kanagawa (JP); Fumito Miyazaki, Yokohama Kanagawa (JP); Daiki Ono, Yokohama Kanagawa (JP); Kei Masunishi, Kawasaki Kanagawa (JP); Kengo Uchida, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 268 days.

(21) Appl. No.: 18/731,900

(22) Filed: Jun. 3, 2024

(65) Prior Publication Data

US 2025/0076089 A1 Mar. 6, 2025

(30) Foreign Application Priority Data

Aug. 29, 2023 (JP) ................................ 2023-139070

(51) Int. Cl.
*G01D 11/24* (2006.01)
*G01D 11/30* (2006.01)
*G01C 19/56* (2012.01)

(52) U.S. Cl.
CPC ........... *G01D 11/245* (2013.01); *G01D 11/30* (2013.01); *G01C 19/56* (2013.01)

(58) Field of Classification Search
CPC ..... G01D 11/245; G01D 11/30; H10W 99/00; G01C 19/56
See application file for complete search history.

(56) References Cited

U.S. PATENT DOCUMENTS 6,944,931 B2 * 9/2005 Shcheglov .............. B81C 3/001 29/595
7,040,163 B2 5/2006 Shcheglov et al.
7,168,318 B2 * 1/2007 Challoner .......... G01C 19/5684 73/504.12

(Continued)

FOREIGN PATENT DOCUMENTS

CN 104990546 A 10/2015
JP 2023-128270 9/2023
JP 2025-33377 A 3/2025

*Primary Examiner* — Jonathan M Dunlap
(74) *Attorney, Agent, or Firm* — Finnegan, Henderson, Farabow, Garrett & Dunner, LLP

(57) ABSTRACT

According to one embodiment, a sensor includes a base including a first face, an inner structure fixed to the first face, a fixed portion fixed to the first face, a movable portion supported by the fixed portion, a plurality of fixed electrodes fixed to the first face, and a plurality of connect members. A first gap is provided between the first face and the movable portion. The movable portion includes a first annular portion and a first connect portion. The plurality of fixed electrodes include a first fixed electrode and a first opposing fixed electrode that face the first annular portion. The inner structure includes a first conductive portion. The first conductive portion includes a first region and a first opposing region. The plurality of connect members include a first connect member and a first opposing connect member.

20 Claims, 7 Drawing Sheets

(56) References Cited

U.S. PATENT DOCUMENTS

| | | | | |
|---|---|---|---|---|
| 7,493,814 | B2 * | 2/2009 | Whelan | G01C 19/5684 73/504.12 |
| 7,581,443 | B2 * | 9/2009 | Kubena | G01C 19/5684 73/504.12 |
| 7,836,765 | B2 * | 11/2010 | Challoner | G01P 15/18 73/504.12 |
| 8,205,495 | B2 * | 6/2012 | Challoner | G01C 19/5684 73/1.77 |
| 8,327,526 | B2 * | 12/2012 | Ge | G01C 25/00 73/497 |
| 2004/0055380 | A1 * | 3/2004 | Shcheglov | G01C 19/5684 73/504.15 |
| 2004/0055381 | A1 * | 3/2004 | Shcheglov | G01C 19/5684 73/504.15 |
| 2005/0172714 | A1 * | 8/2005 | Challoner | G01C 19/5684 73/504.12 |
| 2007/0017287 | A1 * | 1/2007 | Kubena | G01C 19/5684 73/504.02 |
| 2008/0148846 | A1 * | 6/2008 | Whelan | G01C 19/5684 73/504.12 |
| 2009/0301194 | A1 * | 12/2009 | Challoner | G01C 19/5684 73/504.12 |
| 2010/0024546 | A1 * | 2/2010 | Challoner | G01P 15/097 73/504.08 |
| 2010/0300201 | A1 * | 12/2010 | Ge | B81B 7/0048 216/33 |
| 2015/0168146 | A1 * | 6/2015 | Shcheglov | G01C 19/5733 73/504.13 |
| 2023/0280163 | A1 | 9/2023 | Kaji et al. | |
| 2024/0219178 | A1 * | 7/2024 | Hiraga | G01C 19/5783 |
| 2025/0076046 | A1 * | 3/2025 | Murase | G01C 19/5677 |
| 2025/0076047 | A1 * | 3/2025 | Ono | B81B 3/0045 |
| 2025/0076049 | A1 | 3/2025 | Miyazaki et al. | |
| 2025/0076050 | A1 * | 3/2025 | Murase | G01C 19/5712 |

* cited by examiner 10F 10 16 15 14 13 12 11 120 Dr1 41 21 31 30a 30b 32 42 50s 60 Y Z X 28q 28p 23 22 33

SENSOR, SENSOR SYSTEM, AND ELECTRONIC DEVICE

CROSS-REFERENCE TO RELATED APPLICATIONS

This application is based upon and claims the benefit of priority from Japanese Patent Application No. 2023-139070, filed on Aug. 29, 2023; the entire contents of which are incorporated herein by reference.

FIELD

Embodiments described herein relate generally to a sensor, a sensor system, and an electronic device.

BACKGROUND

For example, there are sensors having a MEMS (Micro Electro Mechanical Systems) structure. In some cases, electronic devices and the like are controlled based on information obtained by sensors. It is desired to improve the characteristics of sensors.

DETAILED DESCRIPTION

Figure 1:
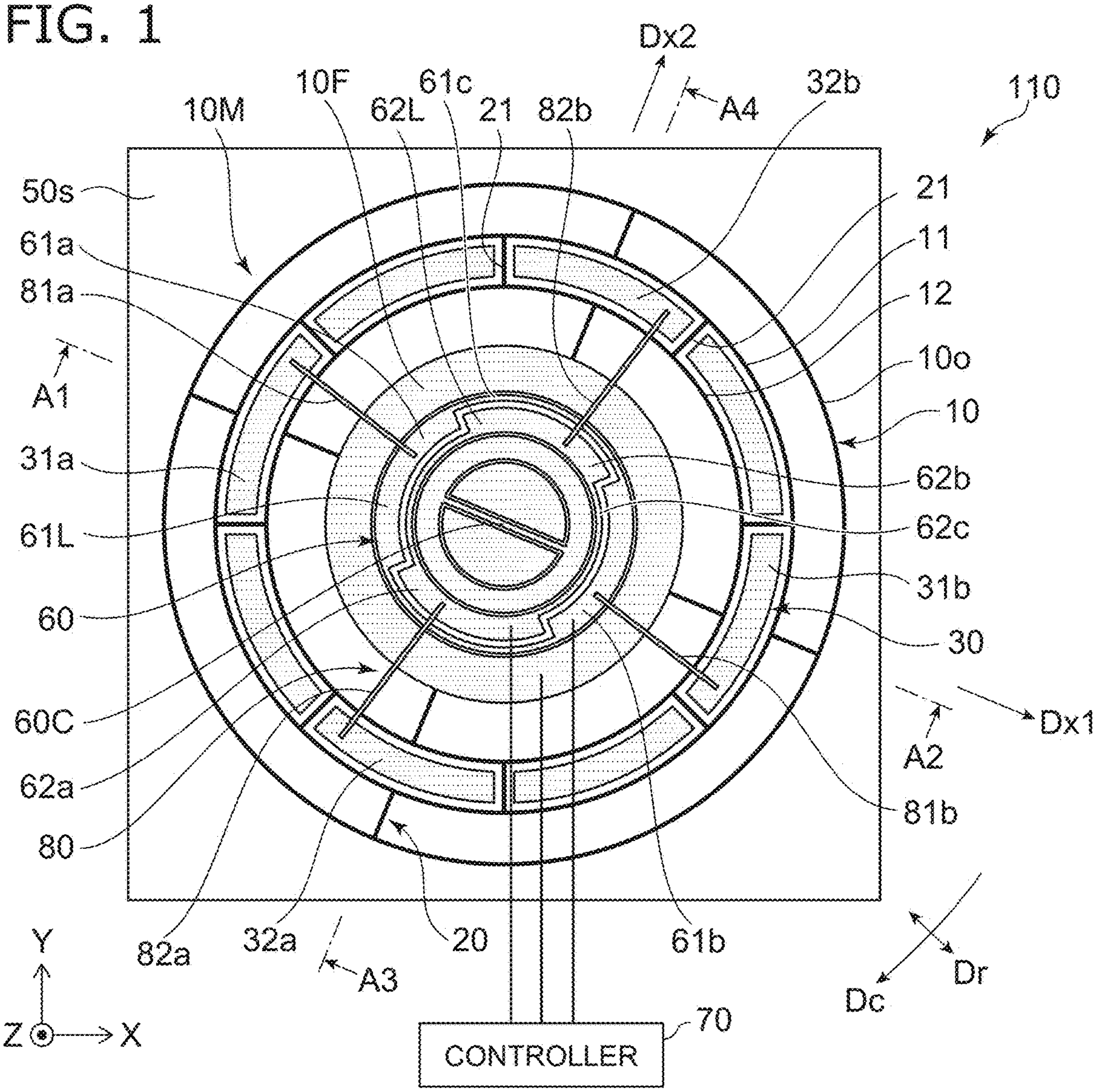
FIG. 1 is a schematic plan view illustrating a sensor according to a first embodiment.

According to one embodiment, a sensor includes a base including a first face, an inner structure fixed to the first face, a fixed portion fixed to the first face, a movable portion supported by the fixed portion, a plurality of fixed electrodes fixed to the first face, and a plurality of connect members. A first gap is provided between the first face and the movable portion. The fixed portion is provided around the inner structure around a first center of the inner structure in a first plane along the first face. The movable portion includes a first annular portion and a first connect portion. The first annular portion is provided around the fixed portion with the fixed portion as a center. The first connect portion is provided between the fixed portion and the first annular portion. The first connect portion directly or indirectly connects the first annular portion to the fixed portion. The plurality of fixed electrodes include a first fixed electrode and a first opposing fixed electrode that face the first annular portion.

The first center is provided between the first fixed electrode and the first opposing fixed electrode. The inner structure includes a first conductive portion. The first conductive portion includes a first region and a first opposing region. The first center is provided between the first region and the first opposing region. The plurality of connect members include a first connect member and a first opposing connect member. The first connect member electrically connects the first region and the first fixed electrode. The first opposing connect member electrically connects the first opposing region and the first opposing fixed electrode.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic plan view illustrating a sensor according to a first embodiment.

Figure 2:
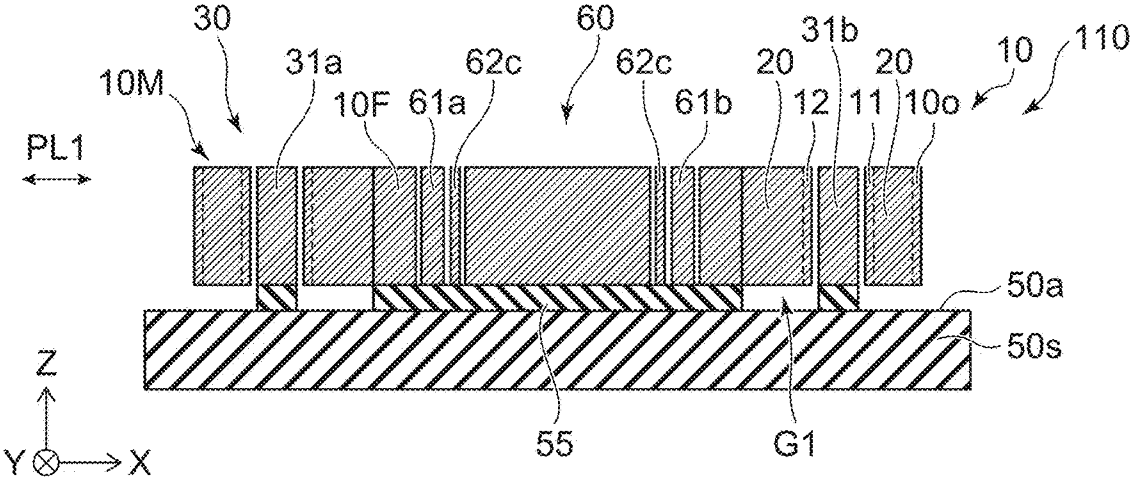
FIG. 2 is a schematic cross-sectional view illustrating the sensor according to the first embodiment.
Figure 3:
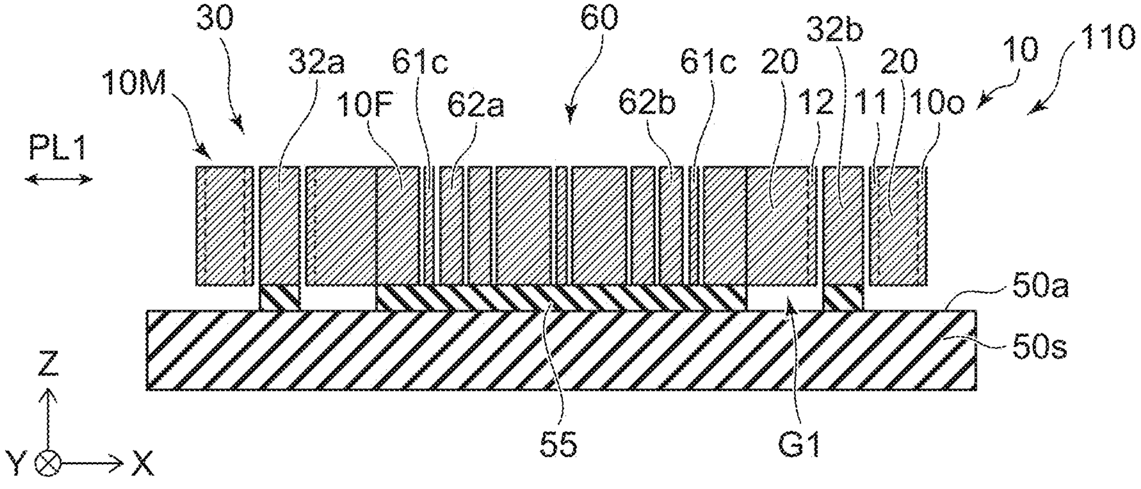
FIG. 3 is a schematic cross-sectional view illustrating the sensor according to the first embodiment.

FIGS. 2 and 3 are schematic cross-sectional views illustrating the sensor according to the first embodiment.

FIG. 2 is a sectional view taken along the line A1-A2 in FIG. 1. FIG. 3 is a sectional view taken along line A3-A4 in FIG. 1.

As shown in FIGS. 1 to 3, a sensor 110 according to the embodiment includes a base 50*s*, an inner structure 60, a fixed portion 10F, a movable portion 10M, a plurality of fixed electrodes 30, and a plurality of connect members 80.

As shown in FIGS. 2 and 3, the base 50*s* includes a first face 50*a*. The inner structure 60 is fixed to the first face 50*a*. The fixed portion 10F is fixed to the first face 50*a*. The movable portion 10M is supported by the fixed portion 10F. The plurality of fixed electrodes 30 are fixed to the first face 50*a*.

As shown in FIGS. 2 and 3, a first gap G1 is provided between the first face 50*a* and the movable portion 10M. For example, an insulating member 55 is provided on the first face 50*a*. The inner structure 60 and the fixed portion 10F are provided on the insulating member 55. The insulating member 55 is not provided between the first face 50*a* and the movable portion 10M.

The movable portion 10M is electrically conductive. The movable portion 10M may include, for example, conductive silicon. The fixed portion 10F is electrically conductive. The fixed portion 10F may include, for example, conductive silicon. The fixed portion 10F is electrically connected to the movable portion 10M. The insulating member 55 may include, for example, silicon oxide.

As shown in FIG. 1, the inner structure 60 includes a first center 60C in a first plane PL1 along the first face 50*a*. The fixed portion 10F is provided around the inner structure 60 with the first center 60C of the inner structure 60 as a center. The inner structure 60 is, for example, annular.

A direction perpendicular to the first plane PL1 is defined as a Z-axis direction. One direction perpendicular to the Z-axis direction is defined as an X-axis direction. A direction perpendicular to the Z-axis direction and the X-axis direction is defined as a Y-axis direction. The first plane PL1 is parallel to the X-Y plane.

As shown in FIG. 1, the movable portion 10M includes a first annular portion 11 and a first connect portion 21. The movable portion 10M may include a plurality of annular portions 10 and a plurality of connect portions 20. The plurality of annular portions 10 may include a first annular portion 11, a second annular portion 12, and the like. The plurality of annular portions 10 may include an outer annular portion 100. The first annular portion 11 may be the outermost portion of the plurality of annular portions 10. In this case, the first annular portion 11 corresponds to the outer annular portion 100. The first annular portion 11 may be the innermost part of the plurality of annular portions 10.

The plurality of annular portions 10 are provided around the fixed portion 10F with the fixed portion 10F as the center. For example, the first annular portion 11 may be provided around the fixed portion 10F with the fixed portion 10F as the center.

The first connect portion 21 is included in the plurality of connect portions 20. The plurality of connect portions 20 connect two of the plurality of annular portions 10. The plurality of connect portions 20 may be arranged along a radial direction Dr. The first connect portion 21 is provided between the fixed portion 10F and the first annular portion 11. The first connect portion 21 directly or indirectly connects the first annular portion 11 to the fixed portion 10F. In this example, the first connect portion 21 indirectly connects the first annular portion 11 to the fixed portion 10F via the second annular portion 12 and other of the connect portions 20. The plurality of connect portions 20 (including the first connect portion 21) extend, for example, along the radial direction Dr.

The plurality of fixed electrodes 30 include a first fixed electrode 31*a* and a first opposing fixed electrode 31*b*. The first fixed electrode 31*a* and the first opposing fixed electrode 31*b* face the first annular portion 11. The first fixed electrode 31*a* and the first opposing fixed electrode 31*b* may be placed inside or outside the first annular portion 11.

The first center 60C is provided between the first fixed electrode 31*a* and the first opposing fixed electrode 31*b*.

The inner structure 60 includes a first conductive portion 61L. The first conductive portion 61L includes a first region 61*a* and a first opposing region 61*b*. The first center 60C is provided between the first region 61*a* and the first opposing region 61*b*.

The plurality of connect members 80 include a first connect member 81*a* and a first opposing connect member 81*b*. The first connect member 81*a* electrically connects the first region 61*a* and the first fixed electrode 31*a*. The first opposing connect member 81*b* electrically connects the first opposing region 61*b* and the first opposing fixed electrode 31*b*.

In the sensor 110, the first fixed electrode 31*a* and the first opposing fixed electrode 31*b* are electrically connected to each other via the first connect member 81*a*, the first opposing connect member 81*b*, and the first conductive portion 61L. These fixed electrodes are electrically connected to each other by the first conductive portion 61L having a small area. For example, even when the size of the sensor 110 is reduced, the desired operation can be stably obtained. According to the embodiment, a sensor with improved characteristics can be provided.

As shown in FIG. 1, a controller 70 may be provided. The controller 70 is configured to supply an electrical signal including alternating current between the first conductive portion 61L and the fixed portion 10F. By the electric signal, alternating current electrostatic force acts between the first fixed electrode 31*a* and the first annular portion 11 and between the first opposing fixed electrode 31*b* and the first annular portion 11. Thereby, the movable portion 10M (first annular portion 11, etc.) can vibrate. For example, when an external force is applied to the movable portion 10M (first annular portion 11, etc.) vibrating, the vibration state changes. The change in vibration state is based on, for example, the Coriolis force. The external force can be detected by detecting changes in the vibration state. The movable portion 10M may be vibrated by another fixed electrode included in the plurality of fixed electrodes 30, and the first fixed electrode 31*a* and the first opposing fixed electrode 31*b* may be used to detect the vibration state.

As described above, in the embodiment, the inner structure 60 provided inside the fixed portion 10F includes the first conductive portion 61L. Electrical connection is made through two regions (first region 61*a* and first opposing region 61*b*) included in the first conductive portion 61L. The first conductive portion 61L functions as a relay point for electrical connection. Electrical connection is efficiently performed by the first conductive portion 61L having a small area.

The plurality of connect members 80 may be, for example, bonding wires. The plurality of connect members 80 may include, for example, at least one selected from the group consisting of gold, silver, copper, and aluminum. The plurality of conductive portions 61 may include, for example, the same material as the material of the movable portion 10M.

The first opposing region 61*b* is electrically connected to the first region 61*a*. For example, the first opposing region 61*b* may be continuous with the first region 61*a*. For example, the first conductive portion 61L may be annular centered on the first center 60C.

As shown in FIG. 1, the first conductive portion 61L may further include a first connect region 61*c*. The first connect region 61*c* is continuous with the first region 61*a* and the first opposing region 61*b*. For example, at least a part of the first connect region 61*c* extends along the circumferential direction Dc centered on the first center 60C.

Figure 4:
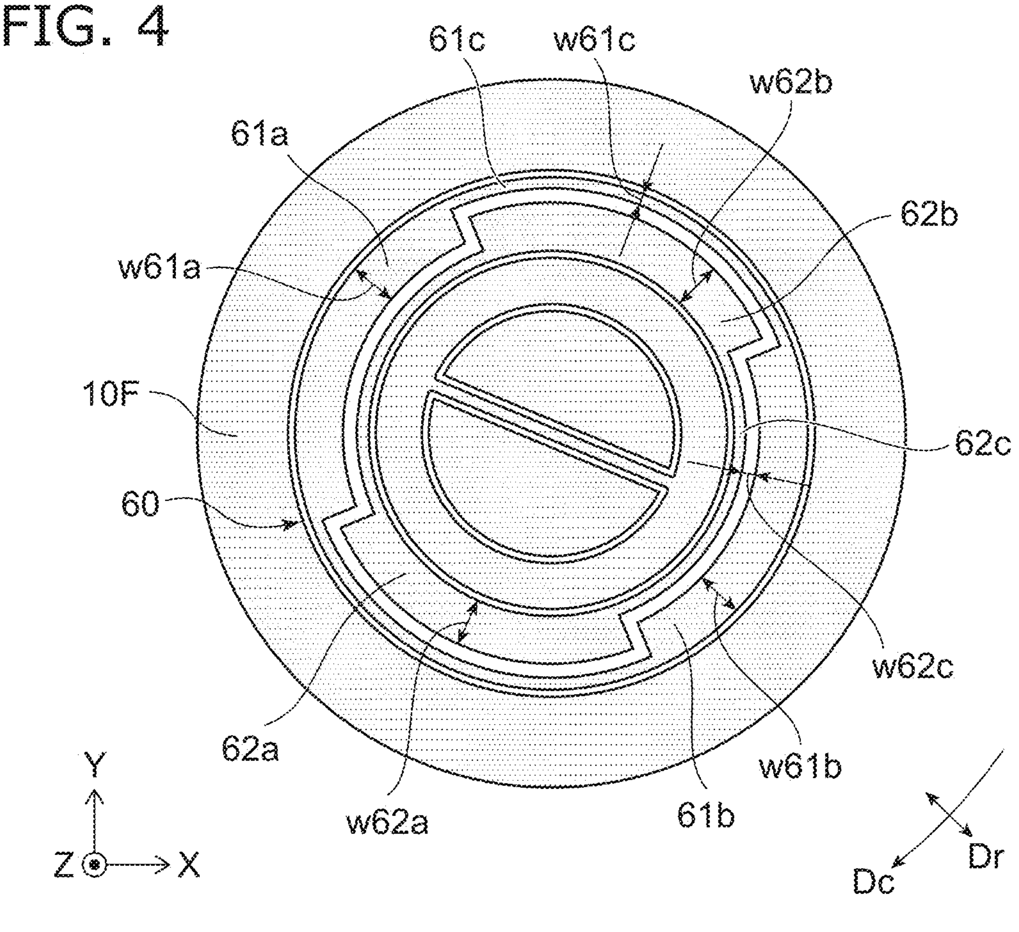
FIG. 4 is a schematic plan view illustrating a part of the sensor according to the first embodiment.

FIG. 4 is a schematic plan view illustrating a part of the sensor according to the first embodiment.

In FIG. 4, a part of FIG. 1 is shown enlarged.

As shown in FIG. 4, the radial direction Dr passes through the first center 60C and is along the first plane PL1 (X-Y plane). A length of at least a part of the first region 61*a* in the radial direction Dr is defined as a first region length w61*a*. A length of at least a part of the first opposing region 61*b* in the radial direction Dr is defined as a first opposing region length w61*b*. A length of at least a part of the first connect region 61*c* in the radial direction Dr is defined as a first connect region length w61*c*. The first region length w61*a* is longer than the first connect region length w61*c*. The first opposing region length w61*b* is, for example, longer than the first connect region length w61*c*.

By the first region length w61*a* and the first opposing region length w61*b* being long, the area of these regions can be increased. Wires can be easily connected to these regions. Noise can be suppressed by a stable connection. For example, good electrical connection can be stably obtained even when the size is small.

As shown in FIG. 1, the plurality of fixed electrodes 30 may further include a second fixed electrode 32*a* and a second opposing fixed electrode 32*b*. The second fixed electrode 32*a* and the second opposing fixed electrode 32*b* face the first annular portion 11. The first center 60C is provided between the second fixed electrode 32*a* and the second opposing fixed electrode 32*b*.

The inner structure 60 may further include a second conductive portion 62L. The second conductive portion 62L includes a second region 62*a* and a second opposing region 62*b*. The first center 60C is provided between the second region 62*a* and the second opposing region 62*b*.

The plurality of connect members 80 include a second connect member 82*a* and a second opposing connect member 82*b*. The second connect member 82*a* electrically connects the second region 62*a* and the second fixed electrode 32*a*. The second opposing connect member 82*b* electrically connects the second opposing region 62*b* and the second opposing fixed electrode 32*b*.

A direction from the first fixed electrode 31*a* to the first opposing fixed electrode 31*b* is defined as a first direction Dx1. A direction from the second fixed electrode 32*a* to the second opposing fixed electrode 32*b* is defined as a second direction Dx2. The second direction Dx2 crosses the first direction Dx1. For example, the first fixed electrode 31*a* and the first opposing fixed electrode 31*b* can generate vibrations along the first direction Dx1. Alternatively, the first fixed electrode 31*a* and the first opposing fixed electrode 31*b* can detect vibrations along the first direction Dx1. For example, the second fixed electrode 32*a* and the second opposing fixed electrode 32*b* can generate vibrations along the second direction Dx2. Alternatively, the second fixed electrode 32*a* and the second opposing fixed electrode 32*b* can detect vibrations along the second direction Dx2.

In a first reference example, the first fixed electrode 31*a* and the first opposing fixed electrode 31*b* are directly electrically connected by one connecting member. Further, the second fixed electrode 32*a* and the second opposing fixed electrode 32*b* are directly electrically connected by another connecting member. In the first reference example, these connecting members cross each other at the center of the annular portions 10. For example, these connecting members capacitively are coupled and generate noise. In the first reference example, high detection accuracy may become insufficient due to the influence of noise. Furthermore, in the first reference example, if the connecting members come into contact and a short circuit occurs, malfunction may occur.

In contrast, in the embodiment, the first fixed electrode 31*a* and the first opposing fixed electrode 31*b* are electrically connected via the first conductive portion 61L. The second fixed electrode 32*a* and the second opposing fixed electrode 32*b* are electrically connected via the second conductive portion 62L. Capacitive coupling is suppressed in these electrical connections. Noise is suppressed. In the embodiment, highly accurate detection is possible. According to the embodiment, a sensor with improved characteristics can be provided. In the embodiment, short circuits are suppressed and malfunctions are suppressed.

In one example, an angle between the first direction Dx1 and the second direction Dx2 is not less than 80 degrees and not more than 100 degrees. The angle between the first direction Dx1 and the second direction Dx2 may be substantially 90 degrees. For example, this angle may be other than 90 degrees. The second direction Dx2 may be inclined with respect to the first direction Dx1.

The second opposing region 62*b* is electrically connected to the second region 62*a*. For example, the second opposing region 62*b* may be continuous with the second region 62*a*.

The second conductive portion 62L may further include a second connect region 62*c*. The second connect region 62*c* is continuous with the second region 62*a* and the second opposing region 62*b*. At least a part of the second connect region 62*c* extends along the circumferential direction Dc centered on the first center 60C. The second conductive portion 62L may be annular centered on the first center 60C. For example, the second conductive portion 62L is concentric with the first conductive portion 61L.

As shown in FIG. 4, the length of at least a part of the second region 62*a* in the radial direction Dr is defined as a second region length w62*a*. The length of at least a part of the second opposing region 62*b* in the radial direction Dr is defined as a second opposing region length w62*b*. The length of at least a part of the second connect region 62*c* in the radial direction Dr is defined as a second connect region length w62*c*. The second region length w62*a* is longer than the second connect region length w62*c*. The second opposing region length w62*b* is, for example, longer than the second connect region length w62*c*.

By the second region length w62*a* and the second opposing region length w62*b* being long, the areas of these regions can be increased. Wires can be easily connected to these regions. Noise can be suppressed by the stable connection. For example, good electrical connection can be stably obtained even when the size is small.

In one example, the first region length w61*a* is not less than three times and not more than four times the first connect region length w61*c*. The first opposing region length w61*b* is not less than three times and not more than four times the first connect region length w61*c*. The first region length w61*a* may be, for example, not less than 130 μm and not more than 280 μm. The first opposing region length w61*b* may be, for example, note less than 130 μm and note more than 280 μm. The first connect region length w61*c* may be, for example, not less than 20 μm and not more than 130 μm.

In one example, the second region length w62*a* is not less than three times and not more than four times the second connect region length w62*c*. The second opposing region length w62*b* is not less than three times and not more than four times the second connect region length w62*c*. The second region length w62*a* may be, for example, not less than 130 μm and not more than 280 μm. The second opposing region length w62*b* may be, for example, not less than 130 μm and not more than 280 μm. The second connect region length w62*c* may be, for example, not less than 20 μm and not more than 130 μm.

At least a part of the second region 62*a* may overlap the first region 61*a* in the circumferential direction Dc centered on the first center 60C. At least a part of the second region 62*a* may overlap the first opposing region 61*b* in the circumferential direction Dc. At least a part of the second opposing region 62*b* may overlap the first region 61*a* in the circumferential direction Dc. At least a part of the second opposing region 62*b* may overlap the first opposing region 61*b* in the circumferential direction Dc.

For example, at least a part of the second region 62*a* is provided between the first region 61*a* and the first opposing region 61*b* in the circumferential direction Dc centered on the first center 60C. For example, at least a part of the first region 61*a* is provided between the second region 62*a* and the second opposing region 62*b* in the circumferential direction Dc. It becomes easy to provide these large-sized regions in small area.

For example, the second conductive portion 62L is concentric with the first conductive portion 61L. The second conductive portion 62L may be annular centered on the first center 60C.

As shown in FIG. 1, at least a part of the second fixed electrode 32*a* is provided between the first fixed electrode 31*a* and the first opposing fixed electrode 31*b* in the circumferential direction Dc centered on the first center 60C. At least a part of the first fixed electrode 31*a* is provided between the second fixed electrode 32*a* and the second opposing fixed electrode 32*b* in the circumferential direction Dc. These fixed electrodes 30 are arranged in the circumferential direction Dc.

In this example, the second conductive portion 62L is provided between the first center 60C and the first conductive portion 61L. In the embodiment, the first conductive portion 61L may be provided between the first center 60C and the second conductive portion 62L.

Figure 5:
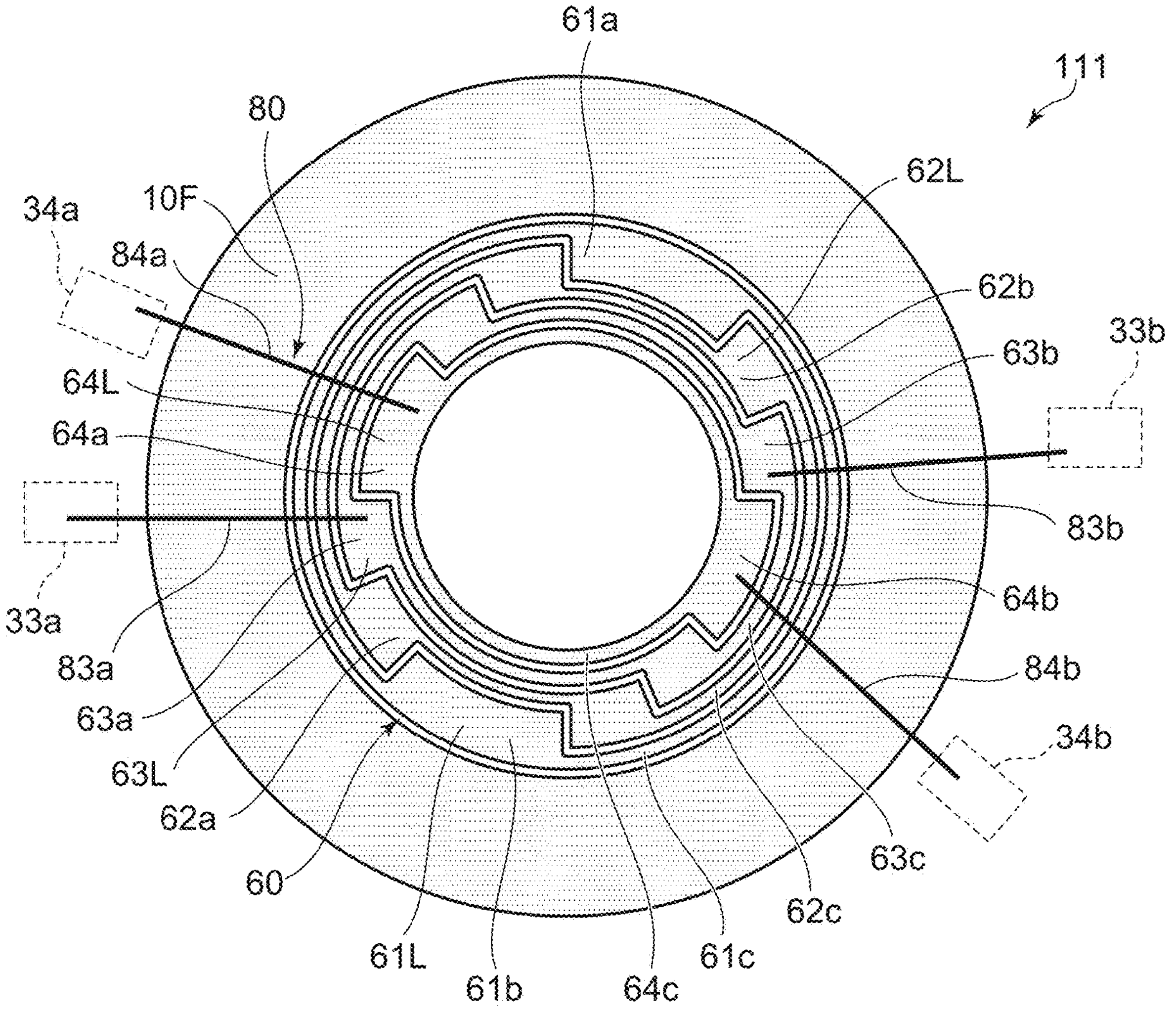
FIG. 5 is a schematic plan view illustrating a sensor according to the first embodiment.

FIG. 5 is a schematic plan view illustrating a sensor according to the first embodiment.

As shown in FIG. 5, in a sensor 111 according to the embodiment, the plurality of fixed electrodes 30 further include a third fixed electrode 33*a*, a third opposing fixed electrode 33*b*, and the like. The configuration of the sensor 111 except for this may be the same as the configuration of the sensor 110.

As shown in FIG. 5, in the sensor 111, the plurality of fixed electrodes 30 further include the third fixed electrode 33*a* and the third opposing fixed electrode 33*b*. The third fixed electrode 33*a* and the third opposing fixed electrode 33*b* face the first annular portion 11.

The inner structure 60 further includes a third conductive portion 63L. For example, the third conductive portion 63L is provided between the first center 60C and the second conductive portion 62L. The third conductive portion 63L includes a third region 63*a* and a third opposing region 63*b*. The first center 60C is provided between the third region 63*a* and the third opposing region 63*b*.

The plurality of connect members 80 further include a third connect member 83*a* and a third opposing connect member 83*b*. In FIG. 5, the first connect member 81*a*, the first opposing connect member 81*b*, the second connect member 82*a*, and the second opposing connect member 82*b* are omitted. The third connect member 83*a* electrically connects the third region 63*a* and the third fixed electrode 33*a*. The third opposing connect member 83*b* electrically connects the third opposing region 63*b* and the third opposing fixed electrode 33*b*. Electrical connections are made in a small area.

At least a part of the third region 63*a* may overlap the second region 62*a* in the circumferential direction Dc centered on the first center 60C. At least a part of the third region 63*a* may overlap the second opposing region 62*b* in the circumferential direction Dc. At least a part of the third opposing region 63*b* may overlap the second region 62*a* in the circumferential direction Dc. At least a part of the third opposing region 63*b* may overlap the second opposing region 62*b* in the circumferential direction Dc.

For example, at least a part of the third region 63*a* is provided between the second region 62*a* and the second opposing region 62*b* in the circumferential direction Dc centered on the first center 60C. For example, at least a part of the second region 62*a* is provided between the third region 63*a* and the third opposing region 63*b* in the circumferential direction Dc. It becomes easy to provide these large-sized regions in small area.

As shown in FIG. 5, in the sensor 111, the plurality of fixed electrodes 30 may further include a fourth fixed electrode 34*a* and a fourth opposing fixed electrode 34*b*. The fourth fixed electrode 34*a* and the fourth opposing fixed electrode 34*b* face the first annular portion 11.

The inner structure 60 further includes a fourth conductive portion 64L. For example, the fourth conductive portion 64L is provided between the first center 60C and the third conductive portion 63L. The fourth conductive portion 64L includes a fourth region 64*a* and a fourth opposing region 64*b*. The first center 60C is provided between the fourth region 64*a* and the fourth opposing region 64*b*.

The plurality of connect members 80 may further include a fourth connect member 84*a* and a fourth opposing connect member 84*b*. The fourth connect member 84*a* electrically connects the fourth region 64*a* and the fourth fixed electrode 34*a*. The fourth opposing connect member 84*b* electrically connects the fourth opposing region 64*b* and the fourth opposing fixed electrode 34*b*. Electrical connections are made in a small area.

At least a part of the fourth region 64*a* may overlap the third region 63*a* in the circumferential direction Dc centered on the first center 60C. At least a part of the fourth region 64*a* may overlap the third opposing region 63*b* in the circumferential direction Dc. At least a part of the fourth opposing region 64*b* may overlap the third region 63*a* in the circumferential direction Dc. At least a part of the fourth opposing region 64*b* may overlap the third opposing region 63*b* in the circumferential direction Dc.

For example, at least a part of the fourth region 64*a* is provided between the third region 63*a* and the third opposing region 63*b* in the circumferential direction Dc centered on the first center 60C. For example, at least a part of the third region 63*a* is provided between the fourth region 64*a* and the fourth opposing region 64*b* in the circumferential direction Dc. It becomes easy to provide these large-sized regions in small area.

Figure 6:
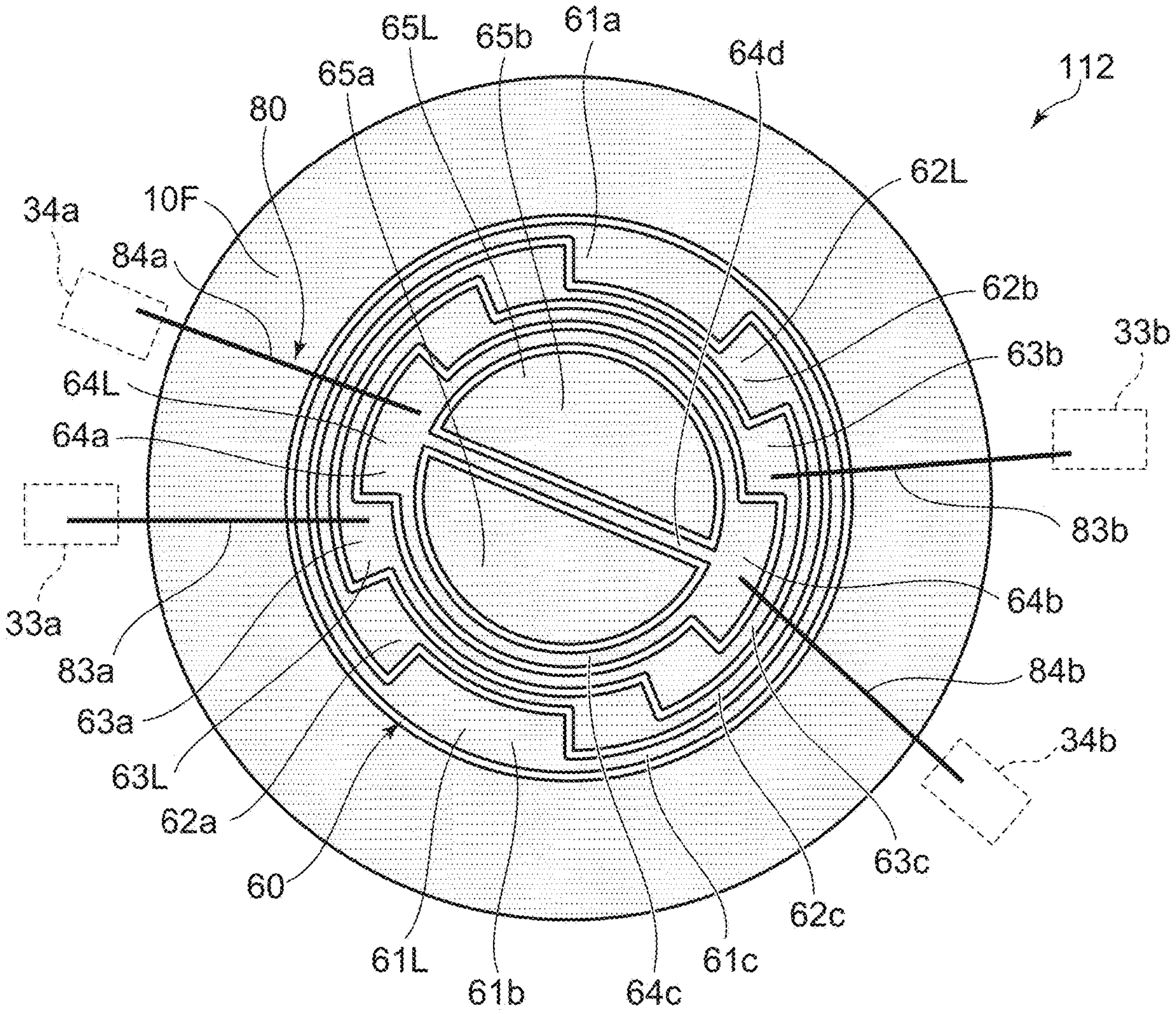
FIG. 6 is a schematic plan view illustrating a sensor according to the first embodiment.

FIG. 6 is a schematic plan view illustrating a sensor according to the first embodiment.

As shown in FIG. 6, in a sensor 112 according to the embodiment, the inner structure 60 further includes a fifth conductive portion 65L. The configuration of the sensor 112 except for this may be the same as the configuration of the sensor 111.

As shown in FIG. 6, in the sensor 112, the fifth conductive portion 65L includes a fifth region 65*a* and a fifth opposing region 65*b*. These regions do not need to be electrically connected. These areas may be used for electrical connection of other electrodes (or movable portion 10M).

As shown in FIG. 6, in this example, the fourth conductive portion 64L further includes another connect region 64*d*. The other connect region 64*d* electrically connects the fourth region 64*a* and the fourth opposing region 64*b*. Another connect region 64*d* may be provided between the fifth region 65*a* and the fifth opposing region 65*b*. Various modifications may be applied to the inner structure 60.

Figure 7:
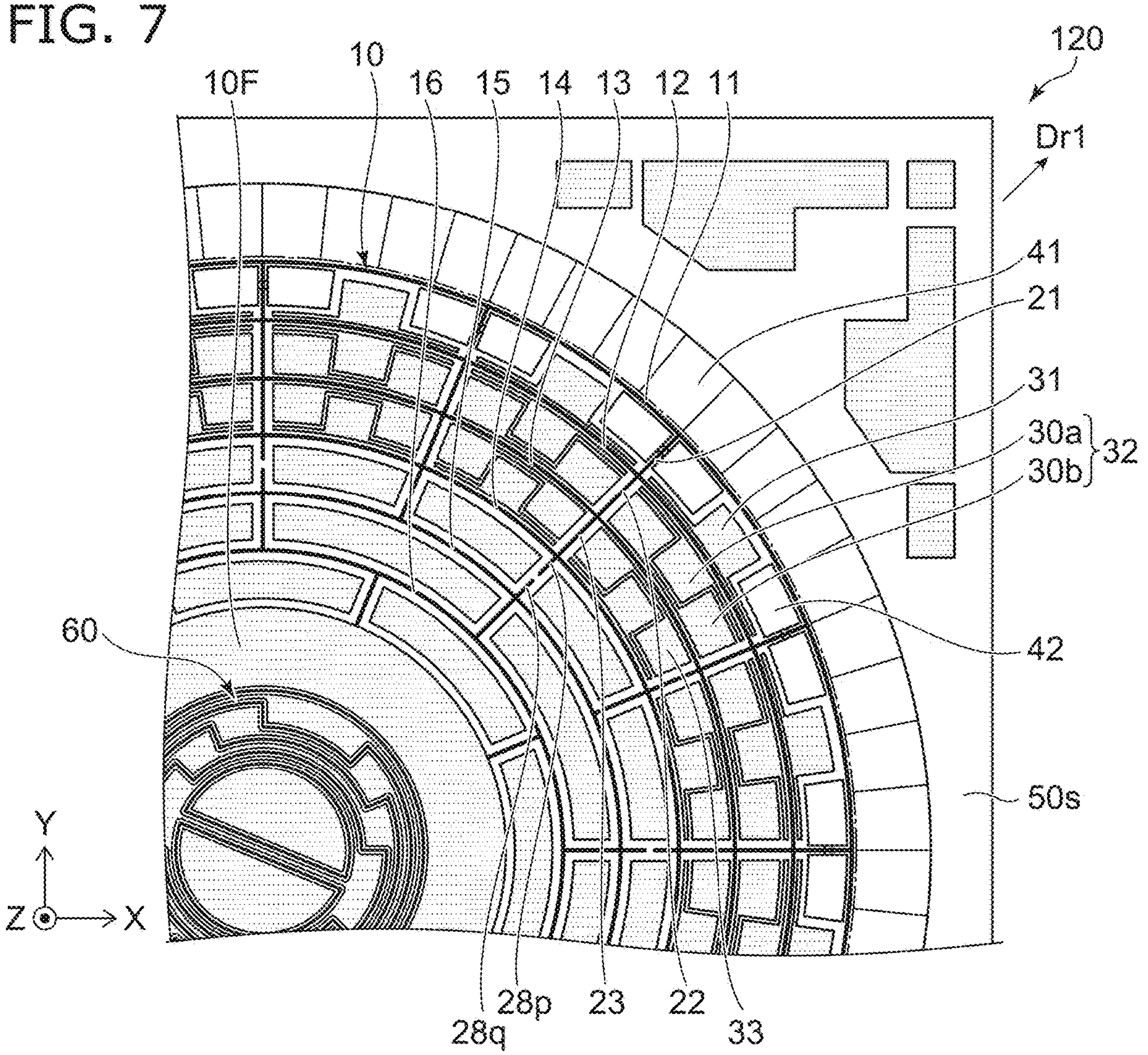
FIG. 7 is a schematic plan view illustrating a sensor according to the first embodiment.

FIG. 7 is a schematic plan view illustrating a sensor according to the first embodiment.

FIG. 7 illustrates the fixed portion 10F and the movable portion 10M. In a sensor 120 according to the embodiment, at least one of the plurality of fixed electrodes 30 includes a plurality of partial electrodes. The configuration of the sensor 120 except for this may be the same as the configuration of the sensor 110 and the like.

In this example, the at least one of the plurality of fixed electrodes 30 is the first fixed electrode 31*a*. The first fixed electrode 31*a* includes a plurality of partial electrodes. The plurality of partial electrodes include a first partial electrode 30*a* and a second partial electrode 30*b*. The first partial electrode 30*a* and the second partial electrode 30*b* are arranged in the circumferential direction Dc. In this example, two of the second partial electrode 30*b* are provided. The first partial electrode 30_a_ is provided between two partial electrodes in the circumferential direction Dc. Different signals may be supplied to the plurality of partial electrodes. Signals obtained from the plurality of partial electrodes may be processed to perform detection.

As shown in FIG. 7, the plurality of annular portions 10 include the first annular portion 11, the second annular portion 12, a third annular portion 13, a fourth annular portion 14, a fifth annular portion 15, and a sixth annular portion 16. These annular portions 10 are arranged concentrically.

As shown in FIG. 7, the plurality of connect portions 20 include the first connect portion 21, a second connect portion 22, a third connect portion 23, and the like. The first connect portion 21 connects the first annular portion 11 and the second annular portion 12 to each other. The second connect portion 22 connects the second annular portion 12 and the third annular portion 13 to each other. The third connect portion 23 connects the third annular portion 13 and the fourth annular portion 14 to each other.

As shown in FIG. 7, the movable portion 10M may further include a first radial structure 28_p_. The first radial structure 28_p_ is connected to one of the plurality of annular portions 10. In this example, the first radial structure 28_p_ is connected to the fourth annular portion 14. The first radial structure 28_p_ extends from one of the plurality of annular portions 10 along the first radial direction Dr1. The first radial structure 28_p_ is separated from another one of the plurality of annular portions 10 in the first radial direction Dr1. In this example, the first radial structure 28_p_ is separated from the fifth annular portion 15 in the first radial direction Dr1. The other one of the plurality of annular portions 10 is next to the one of the plurality of annular portions 10 among the plurality of annular portions 10. The other one of the plurality of annular portions 10 is closest to the one of the plurality of annular portions 10 among the plurality of annular portions 10.

The movable portion 10M may further include a second radial structure 28_q_. The second radial structure 28_q_ is connected to the other one of the plurality of annular portions 10. The second radial structure 28_q_ is connected to the fifth annular portion 15. The second radial structure 28_q_ extends from the other one of the plurality of annular portions 10 toward the one of the plurality of annular portions 10 along the first radial direction Dr1. The second radial structure 28_q_ extends from the fifth annular portion 15 toward the fourth annular portion 14 along the first radial direction Dr1. The second radial structure 28_q_ is separated from the first radial structure 28_p_ in the first radial direction Dr1.

By providing such a radial structure, the overall mass distribution can be made uniform without connecting the annular portions 10 being adjacent. It becomes easier to obtain higher characteristics.

As shown in FIG. 7, in this example, the direction in which the second connect portion 22 extends (first radial direction Dr1) is along the direction in which the third connect portion 23 extends. For example, it becomes easier to obtain a detection signal with high intensity.

As shown in FIG. 7, the movable portion 10M may include a first structure 41 connected to the first annular portion 11. The first structure 41 functions as a mass member, for example. Noise is further suppressed. In this example, the first structure 41 is provided outside the first annular portion 11. The movable portion 10M may include a second structure 42. The second structure 42 is provided inside the first annular portion 11. The second structure 42 may be connected to the first annular portion 11 or the first connect portion 21.

Second Embodiment

A second embodiment relates to an electronic device.

Figure 8:
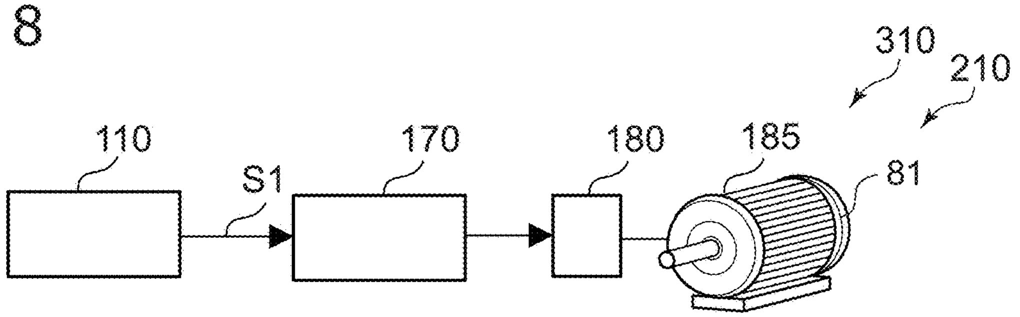
FIG. 8 is a schematic diagram illustrating an electronic device according to a second embodiment.

FIG. 8 is a schematic diagram illustrating an electronic device according to a second embodiment.

As shown in FIG. 8, an electronic device 310 according to the embodiment includes the sensors according to the first to third embodiments and the circuit processor 170. In the example of FIG. 8, the sensor 110 is drawn as the sensor. The circuit processor 170 is configured to control a circuit 180 based on the signal S1 obtained from the sensor. The circuit 180 is, for example, a control circuit for a drive device 185. According to the embodiment, for example, the circuit 180 for controlling the drive device 185 can be controlled with high accuracy.

As shown in FIG. 8, the sensor system 210 according to the embodiment includes the sensor (for example, the sensor 110) according to the first embodiment and a detection target member 81. The sensor 110 is fixed to the detection target member 81. The sensor 110 can detect a signal from the detection target member 81.

FIGS. 9A to 9H are schematic views illustrating applications of the electronic device according to the embodiment.

Figure 9A:
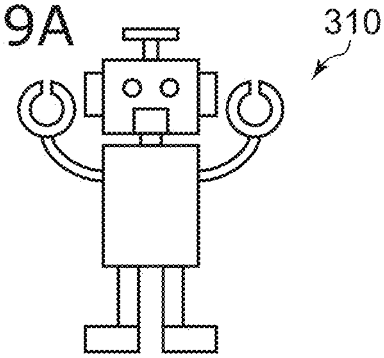
FIGS. 9A to 9H are schematic views illustrating applications of the electronic device according to the embodiment.
Figure 9B:
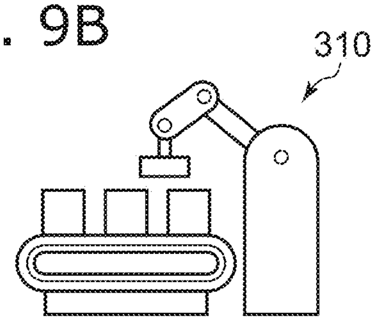
Figure 9C:
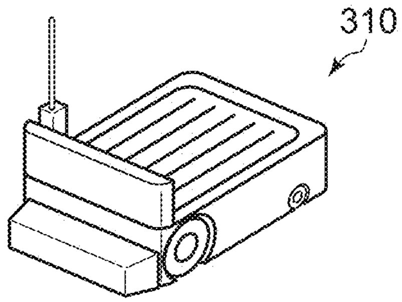
Figure 9D:
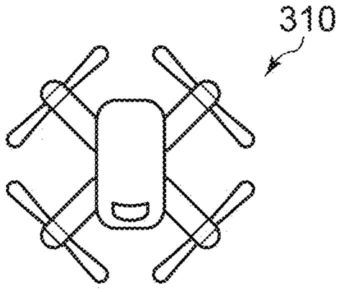
Figure 9E:
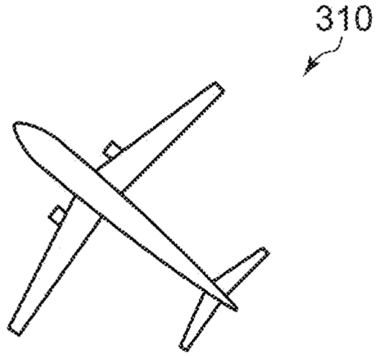
Figure 9F:
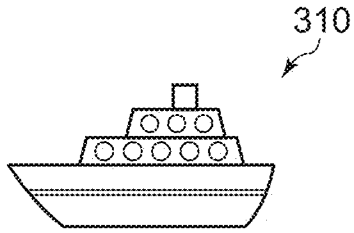
Figure 9G:
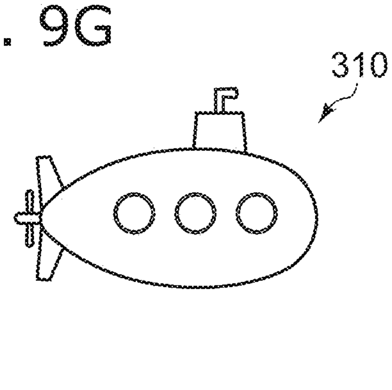
Figure 9H:
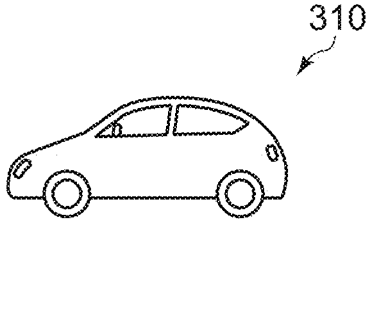

As shown in FIG. 9A, the electronic device 310 may be at least a portion of a robot. As shown in FIG. 9B, the electronic device 310 may be at least a portion of a machining robot provided in a manufacturing plant, etc. As shown in FIG. 9C, the electronic device 310 may be at least a portion of an automatic guided vehicle inside a plant, etc. As shown in FIG. 9D, the electronic device 310 may be at least a portion of a drone (an unmanned aircraft). As shown in FIG. 9E, the electronic device 310 may be at least a portion of an airplane. As shown in FIG. 9F, the electronic device 310 may be at least a portion of a ship. As shown in FIG. 9G, the electronic device 310 may be at least a portion of a submarine. As shown in FIG. 9H, the electronic device 310 may be at least a portion of an automobile. The electronic device 310 may include, for example, at least one of a robot or a moving body.

Figure 10A:
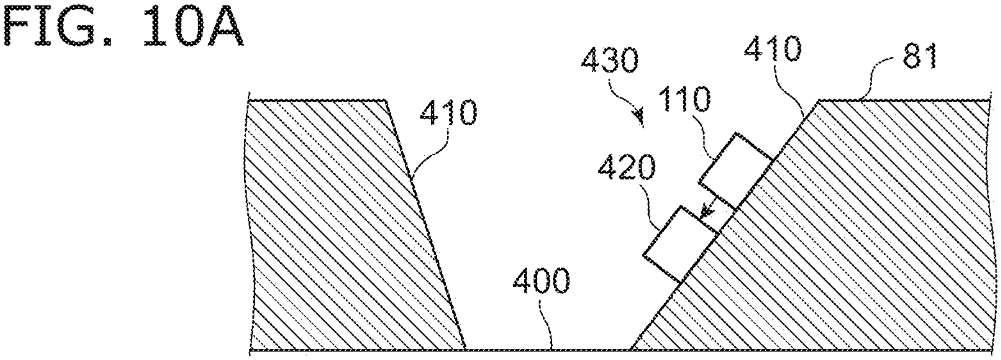
FIGS. 10A and 10B are schematic views illustrating applications of the sensor according to the embodiment.
Figure 10B:
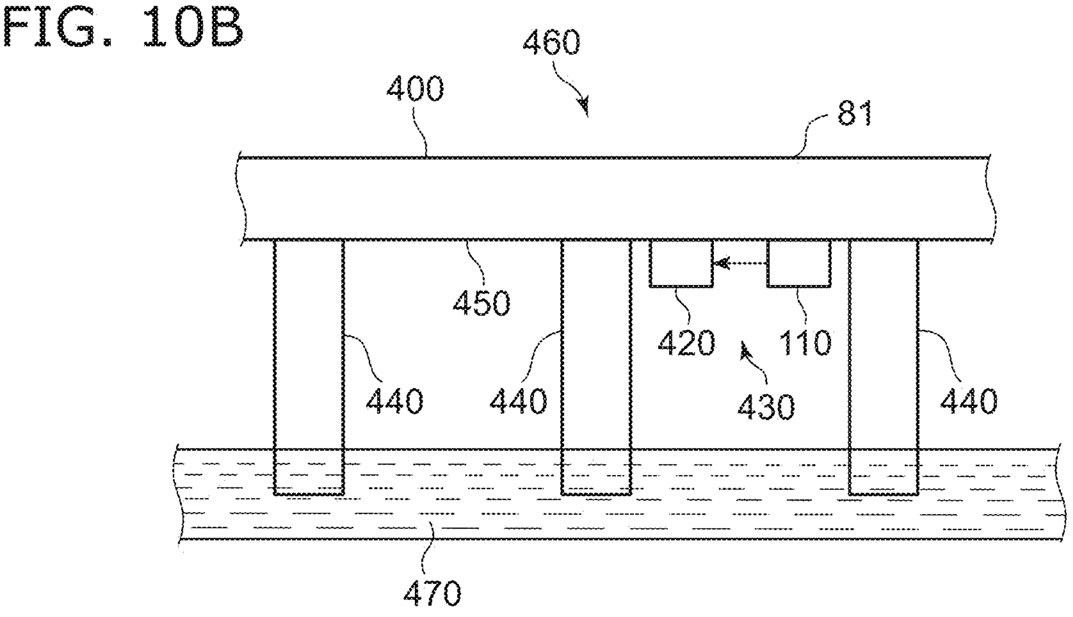

FIGS. 10A and 10B are schematic views illustrating applications of the sensor according to the embodiment.

As shown in FIG. 10A, a sensor 430 according to the fifth embodiment includes the sensor according to one of the first to third embodiments, and a transmission/reception part 420. In the example of FIG. 10A, the sensor 110 is illustrated as the sensor. The transmission/reception part 420 is configured to transmit the signal obtained from the sensor 110 by, for example, at least one of wireless and wired methods. The sensor 430 is provided on, for example, a slope surface 410 such as a road 400. The sensor 430 can monitor the state of, for example, a facility (e.g., infrastructure). The sensor 430 may be, for example, a state monitoring device.

For example, the sensor 430 detects a change in the state of a slope surface 410 of a road 400 with high accuracy. The change in the state of the slope surface 410 includes, for example, at least one of a change in the inclination angle and a change in the vibration state. The signal (inspection result) obtained from the sensor 110 is transmitted by the transmission/reception part 420. The status of a facility (e.g., infrastructure) can be monitored, for example, continuously.

As shown in FIG. 10B, the sensor 430 is provided, for example, in a portion of a bridge 460. The bridge 460 is provided above the river 470. For example, the bridge 460 includes at least one of a main girder 450 and a pier 440. The sensor 430 is provided on at least one of the main girder 450 and the pier 440. For example, at least one of the angles of the main girder 450 and the pier 440 may change due to deterioration or the like. For example, the vibration state may change in at least one of the main girder 450 and the pier 440. The sensor 430 detects these changes with high accuracy. The detection result can be transmitted to an arbitrary place by the transmission/reception part 420. Abnormalities can be detected effectively.

The embodiments may include the following Technical proposals:

(Technical Proposal 1)

A sensor, comprising:

a base including a first face;

an inner structure fixed to the first face;

a fixed portion fixed to the first face;

a movable portion supported by the fixed portion;

a plurality of fixed electrodes fixed to the first face; and a plurality of connect members, a first gap being provided between the first face and the movable portion, the fixed portion being provided around the inner structure around a first center of the inner structure in a first plane along the first face, the movable portion including a first annular portion and a first connect portion, the first annular portion being provided around the fixed portion with the fixed portion as a center, the first connect portion being provided between the fixed portion and the first annular portion, the first connect portion directly or indirectly connecting the first annular portion to the fixed portion, the plurality of fixed electrodes including a first fixed electrode and a first opposing fixed electrode, the first fixed electrode and the first opposing fixed electrode facing the first annular portion, the first center being provided between the first fixed electrode and the first opposing fixed electrode, the inner structure including a first conductive portion, the first conductive portion including a first region and a first opposing region, the first center being provided between the first region and the first opposing region, the plurality of connect members including a first connect member and a first opposing connect member, the first connect member electrically connecting the first region and the first fixed electrode, and the first opposing connect member electrically connecting the first opposing region and the first opposing fixed electrode.

(Technical Proposal 2)

The sensor according to Technical proposal 1, wherein the first opposing region is continuous with the first region.

(Technical Proposal 3)

The sensor according to Technical proposal 1 or 2, wherein the first conductive portion further includes a first connect region, the first connect region is continuous with the first region and the first opposing region, and at least a part of the first connect region extends along a circumferential direction centered on the first center.

(Technical Proposal 4)

The sensor according to Technical proposal 3, wherein a first region length in a radial direction of at least a part of the first region is longer than a first connect region length in the radial direction of the at least a part of the first connect region, a first opposing region length in the radial direction of at least a part of the first opposing region is longer than the first connect region length, and the radial direction passes through the first center and is along the first plane.

(Technical Proposal 5)

The sensor according to any one of Technical proposals 1-4, wherein the first conductive portion is annular centered on the first center.

(Technical Proposal 6)

The sensor according to Technical proposal 1 or 2, wherein the plurality of fixed electrodes include a second fixed electrode and a second opposing fixed electrode, the second fixed electrode and the second opposing fixed electrode facing the first annular portion, the first center is provided between the second fixed electrode and the second opposing fixed electrode, the inner structure further includes a second conductive portion, the second conductive portion includes a second region and a second opposing region, the first center is provided between the second region and the second opposing region, the plurality of connect members further include a second connect member and a second opposing connect member, the second connect member electrically connects the second region and the second fixed electrode, and the second opposing connect member electrically connects the second opposing region and the second opposing fixed electrode.

(Technical Proposal 7)

The sensor according to Technical proposal 6, wherein a second direction from the second fixed electrode to the second opposing fixed electrode crosses a first direction from the first fixed electrode to the first opposing fixed electrode.

(Technical Proposal 8)

The sensor according to Technical proposal 7, wherein an angle between the first direction and the second direction is not less than 80 degrees and not more than 100 degrees.

(Technical Proposal 9)

The sensor according to any one of Technical proposals 6-8, wherein at least a part of the second region overlaps the first region in a circumferential direction centered on the first center.

(Technical Proposal 10)

The sensor according to any one of Technical proposals 6-8, wherein at least a part of the second region is provided between the first region and the first opposing region in a circumferential direction centered on the first center, and at least a part of the first region is provided between the second region and the second opposing region in the circumferential direction.

(Technical Proposal 11)

The sensor according to any one of Technical proposals 6-10, wherein the second opposing region is continuous with the second region.

(Technical Proposal 12)

The sensor according to any one of Technical proposals 6-8, wherein the second conductive portion further includes a second connect region, the second connect region is continuous with the second region and the second opposing region, and at least a part of the second connect region extends along a circumferential direction centered on the first center.

(Technical Proposal 13)

The sensor according to Technical proposal 12, wherein a second region length in a radial direction of at least a part of the second region is longer than a second connect region length in the radial direction of the at least a part of the second connect region, a second opposing region length in the radial direction of at least a part of the second opposing region is longer than the second connect region length, and the radial direction passes through the first center and is along the first plane.

(Technical Proposal 14)

The sensor according to any one of Technical proposals 6-8, wherein at least a part of the second fixed electrode is provided between the first fixed electrode and the first opposing fixed electrode in a circumferential direction centered on the first center, and at least a part of the first fixed electrode is provided between the second fixed electrode and the second opposing fixed electrode in the circumferential direction.

(Technical Proposal 15)

The sensor according to any one of Technical proposals 6-14, wherein the second conductive portion is annular centered on the first center.

(Technical proposal 16)

The sensor according to any one of Technical proposals 6-15, wherein the second conductive portion is provided between the first center and the first conductive portion.

(Technical proposal 17)

The sensor according to any one of Technical proposals 6-16, wherein the inner structure further includes a third conductive portion, the third conductive portion is provided between the first center and the second conductive portion, the third conductive portion further includes a third region and a third opposing region, the first center is provided between the third region and the third opposing region, the plurality of connect members include a third connect member and a third opposing connect member, the third connect member electrically connects the third region and the third fixed electrode, and the third opposing connect member electrically connects the third opposing region and the third opposing fixed electrode.

(Technical Proposal 18)

The sensor according to Technical proposal 17, wherein the plurality of fixed electrodes further include a fourth fixed electrode and a fourth opposing fixed electrode, the fourth fixed electrode and the fourth opposing fixed electrode facing the first annular portion, the inner structure further includes a fourth conductive portion, the fourth conductive portion is provided between the first center and the third conductive portion, the fourth conductive portion further includes a fourth region and a fourth opposing region, the first center is provided between the fourth region and the fourth opposing region, the plurality of connect members include a fourth connect member and a fourth opposing connect member, the fourth connect member electrically connects the fourth region and the fourth fixed electrode, and the fourth opposing connect member electrically connects the fourth opposing region and the fourth opposing fixed electrode.

(Technical Proposal 19)

A sensor system, comprising:

the sensor according to Technical proposal 1; and a detection target member, the sensor being fixed to the detection target member.

(Technical Proposal 20)

An electronic device, comprising:

the sensor according to any one of Technical proposals 1-18; and a circuit controller configured to control a circuit based on a signal obtained from the sensor.

According to the embodiment, a sensor, a sensor system, and an electronic device whose characteristics can be improved can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in the sensor such as members, substrates, sensor sections, housings, sensor elements, bases, fixed portions, movable portions, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors, all sensor systems, and all electronic devices practicable by an appropriate design modification by one skilled in the art based on the sensors, the sensor systems, and the electronic devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:

a base including a first face;

an inner structure fixed to the first face;

a fixed portion fixed to the first face;

a movable portion supported by the fixed portion;

a plurality of fixed electrodes fixed to the first face; and a plurality of connect members, a first gap being provided between the first face and the movable portion, the fixed portion being provided around the inner structure around a first center of the inner structure in a first plane along the first face, the movable portion including a first annular portion and a first connect portion, the first annular portion being provided around the fixed portion with the fixed portion as a center, the first connect portion being provided between the fixed portion and the first annular portion, the first connect portion directly or indirectly connecting the first annular portion to the fixed portion, the plurality of fixed electrodes including a first fixed electrode and a first opposing fixed electrode, the first fixed electrode and the first opposing fixed electrode facing the first annular portion, the first center being provided between the first fixed electrode and the first opposing fixed electrode, the inner structure including a first conductive portion, the first conductive portion including a first region and a first opposing region, the first center being provided between the first region and the first opposing region, the plurality of connect members including a first connect member and a first opposing connect member, the first connect member electrically connecting the first region and the first fixed electrode, and the first opposing connect member electrically connecting the first opposing region and the first opposing fixed electrode.

2. The sensor according to claim 1, wherein the first opposing region is continuous with the first region.

3. The sensor according to claim 1, wherein the first conductive portion further includes a first connect region, the first connect region is continuous with the first region and the first opposing region, and at least a part of the first connect region extends along a circumferential direction centered on the first center.

4. The sensor according to claim 3, wherein a first region length in a radial direction of at least a part of the first region is longer than a first connect region length in the radial direction of the at least a part of the first connect region, a first opposing region length in the radial direction of at least a part of the first opposing region is longer than the first connect region length, and the radial direction passes through the first center and is along the first plane.

5. The sensor according to claim 1, wherein the first conductive portion is annular centered on the first center.

6. The sensor according to claim 1, wherein the plurality of fixed electrodes include a second fixed electrode and a second opposing fixed electrode, the second fixed electrode and the second opposing fixed electrode facing the first annular portion, the first center is provided between the second fixed electrode and the second opposing fixed electrode, the inner structure further includes a second conductive portion, the second conductive portion includes a second region and a second opposing region, the first center is provided between the second region and the second opposing region, the plurality of connect members further include a second connect member and a second opposing connect member, the second connect member electrically connects the second region and the second fixed electrode, and the second opposing connect member electrically connects the second opposing region and the second opposing fixed electrode.

7. The sensor according to claim 6, wherein a second direction from the second fixed electrode to the second opposing fixed electrode crosses a first direction from the first fixed electrode to the first opposing fixed electrode.

8. The sensor according to claim 7, wherein an angle between the first direction and the second direction is not less than 80 degrees and not more than 100 degrees.

9. The sensor according to claim 6, wherein at least a part of the second region overlaps the first region in a circumferential direction centered on the first center.

10. The sensor according to claim 6, wherein at least a part of the second region is provided between the first region and the first opposing region in a circumferential direction centered on the first center, and at least a part of the first region is provided between the second region and the second opposing region in the circumferential direction.

11. The sensor according to claim 6, wherein the second opposing region is continuous with the second region.

12. The sensor according to claim 6, wherein the second conductive portion further includes a second connect region, the second connect region is continuous with the second region and the second opposing region, and at least a part of the second connect region extends along a circumferential direction centered on the first center.

13. The sensor according to claim 12, wherein a second region length in a radial direction of at least a part of the second region is longer than a second connect region length in the radial direction of the at least a part of the second connect region, a second opposing region length in the radial direction of at least a part of the second opposing region is longer than the second connect region length, and the radial direction passes through the first center and is along the first plane.

14. The sensor according to claim 6, wherein at least a part of the second fixed electrode is provided between the first fixed electrode and the first opposing fixed electrode in a circumferential direction centered on the first center, and at least a part of the first fixed electrode is provided between the second fixed electrode and the second opposing fixed electrode in the circumferential direction.

15. The sensor according to claim 6, wherein the second conductive portion is annular centered on the first center.

16. The sensor according to claim 6, wherein the second conductive portion is provided between the first center and the first conductive portion.

17. The sensor according to claim 6, wherein the inner structure further includes a third conductive portion, the third conductive portion is provided between the first center and the second conductive portion, the third conductive portion further includes a third region and a third opposing region, the first center is provided between the third region and the third opposing region, the plurality of connect members include a third connect member and a third opposing connect member, the third connect member electrically connects the third region and the third fixed electrode, and the third opposing connect member electrically connects the third opposing region and the third opposing fixed electrode.

18. The sensor according to claim 17, wherein the plurality of fixed electrodes further include a fourth fixed electrode and a fourth opposing fixed electrode, the fourth fixed electrode and the fourth opposing fixed electrode facing the first annular portion, the inner structure further includes a fourth conductive portion, the fourth conductive portion is provided between the first center and the third conductive portion, the fourth conductive portion further includes a fourth region and a fourth opposing region, the first center is provided between the fourth region and the fourth opposing region, the plurality of connect members include a fourth connect member and a fourth opposing connect member, the fourth connect member electrically connects the fourth region and the fourth fixed electrode, and the fourth opposing connect member electrically connects the fourth opposing region and the fourth opposing fixed electrode.

19. A sensor system, comprising:

the sensor according to claim 1; and a detection target member, the sensor being fixed to the detection target member.

20. An electronic device, comprising:

the sensor according to claim 1; and a circuit controller configured to control a circuit based on a signal obtained from the sensor.

* * * * *